United States Patent
Brown et al.

[11] Patent Number: 6,150,473
[45] Date of Patent: Nov. 21, 2000

[54] POLYETHERIMIDE RESIN/POLYESTER RESIN BLENDS HAVING IMPROVED PROPERTIES

[75] Inventors: Sterling Bruce Brown, Niskayuna, N.Y.; Yimin Jin, Newburgh, Ind.; James F. Kelley, Troy, N.Y.; Jun Liao, Evansville, Ind.; Michael Teruki Takemori, Rexford, N.Y.; Raymond Lee Utley, Mt. Vernon, Ind.

[73] Assignee: General Electric Company, Pittsfield, Mass.

[21] Appl. No.: 09/211,304

[22] Filed: Dec. 14, 1998

[51] Int. Cl.[7] .................................................. C08L 63/00
[52] U.S. Cl. ........................................... 525/423; 525/418
[58] Field of Search .............................................. 525/423

[56] References Cited

U.S. PATENT DOCUMENTS

| | | | |
|---|---|---|---|
| 4,141,927 | 2/1979 | White et al. | 260/857 |
| 4,250,279 | 2/1981 | Robeson et al. | 525/425 |
| 4,448,937 | 5/1984 | Bopp et al. | 525/432 |
| 4,587,299 | 5/1986 | Giles, Jr. | 525/92 |
| 4,661,559 | 4/1987 | Gardner et al. | 525/65 |
| 4,908,418 | 3/1990 | Holub | 525/425 |
| 5,221,730 | 6/1993 | Morris et al. | 528/194 |
| 5,237,038 | 8/1993 | Morris et al. | 528/194 |
| 5,254,640 | 10/1993 | Tyrell et al. | 525/423 |
| 5,262,493 | 11/1993 | Tyrell et al. | 525/434 |
| 5,284,903 | 2/1994 | Minnick | 524/538 |
| 5,439,987 | 8/1995 | Scott et al. | 525/425 |
| 5,521,258 | 5/1996 | Cooper et al. | 525/425 |
| 5,633,319 | 5/1997 | Silvi et al. | 525/133 |
| 5,648,433 | 7/1997 | Scott | 525/425 |
| 5,661,223 | 8/1997 | Oka et al. | 525/481 |

FOREIGN PATENT DOCUMENTS

| | | |
|---|---|---|
| 0117327 A1 | of 1983 | European Pat. Off. . |
| 0 186 243 | of 1985 | European Pat. Off. . |
| 0 186 927 | of 1985 | European Pat. Off. . |
| 0 187 416 | of 1985 | European Pat. Off. . |
| 0 383 977 | of 1989 | European Pat. Off. . |
| 0 430 640 A1 | 11/1990 | European Pat. Off. . |
| 0 420 619 A2 | of 1991 | European Pat. Off. . |
| 0 785 235 A2 | 7/1997 | European Pat. Off. . |
| WO 94/01495 | of 1994 | WIPO . |

*Primary Examiner*—Ana Woodward

[57] ABSTRACT

The present invention is directed to a thermoplastic resin composition comprising one or more polyetherimide resins; one or more polyester resins; at least one epoxy compound having one or more epoxy functional groups per molecule in an amount effective to improve at least one of impact resistance, hydrolytic resistance, and tab-bending performance of a molded specimen of the composition; and optionally, at least one catalyst in an amount effective to improve at least one of impact resistance, hydrolytic resistance, and tab-bending performance of a molded specimen of the composition as compared to the same composition not containing the catalyst. It was unexpectedly found that the compositions exhibited enhanced heat, impact, hydrolytic resistance, and/or enhanced tab-bending performance over other compositions known in the art. In a preferred embodiment, the epoxy compound contains 3,4-epoxycyclohexylmethyl-3,4-epoxycyclohexanecarboxylate and the catalyst contains sodium stearate.

15 Claims, 2 Drawing Sheets

POLYETHERIMIDE RESIN/POLYESTER RESIN BLENDS HAVING IMPROVED PROPERTIES

CROSS-REFERENCE TO RELATED APPLICATIONS

Not applicable.

FEDERALLY SPONSORED RESEARCH

Not applicable.

FIELD OF THE INVENTION

The present invention relates to thermoplastic resin blends, more specifically to blends of polyetherimide and polyester resins.

BACKGROUND

Blends of polyetherimide and polyester resins derived predominantly from cyclohexanedimethanol and a carbocyclic dicarboxylic acid, such as, for example, a poly (cyclohexane-dimethanol terephthalate) resin that provide improved impact strength are disclosed in U.S. Pat. No. 5,439,987. Blends of polyetherimide resins and copolyesters of terephthalic acid and/or isophthalic acid, 1,4-cyclohexanedimethanol and ethylene glycol, that is, certain poly(cyclohexane-1,4-dimethylene-co-ethylene terephthalate) resins that are said to exhibit a high flexural modulus are disclosed in U.S. Pat. No. 5,439,987.

Use of these polyetherimide-polyester blends has become prominent in areas such as microwave food containers and others where visual clarity is desired and often demanded by the consumers, and the articles formed from these blends are often subjected to significant stresses including bending such that tab-bending performance is important. This prominence is driving the need in the industry for improved blends. Consequently, polyetherimide-polyester blends that exhibit visual clarity, resistance to elevated temperature, and further improvements in thermal and hydrolytic stability, impact resistance, and tab-bending performance, are desired.

SUMMARY OF THE INVENTION

The present invention is directed to a thermoplastic resin composition comprising, based upon 100 parts by weight ("pbw") of the thermoplastic composition:

(a) from about 1 to less than about 99 pbw of one or more polyetherimide resins;

(b) from about 1 to less than about 99 pbw of one or more polyester resins;

(c) at least one epoxy compound having one or more epoxy functional groups per molecule in an amount effective to improve at least one of impact resistance, hydrolytic resistance, and tab-bending performance of a molded specimen of the composition; and (d) optionally, at least one catalyst in an amount effective to improve at least one of impact resistance, hydrolytic resistance, and tab-bending performance of a molded specimen of the composition as compared to the same composition not containing the catalyst.

In a preferred embodiment, the epoxy compound comprises (3,4-epoxycyclohexylmethyl-3,4-epoxycyclohexanecarboxylate).

BRIEF DESCRIPTION OF THE DRAWINGS

The present invention will now be described, by way of example only, with reference to the accompanying drawings which are meant to be exemplary, not limiting.

DETAILED DESCRIPTION OF THE INVENTION

Figure 1:
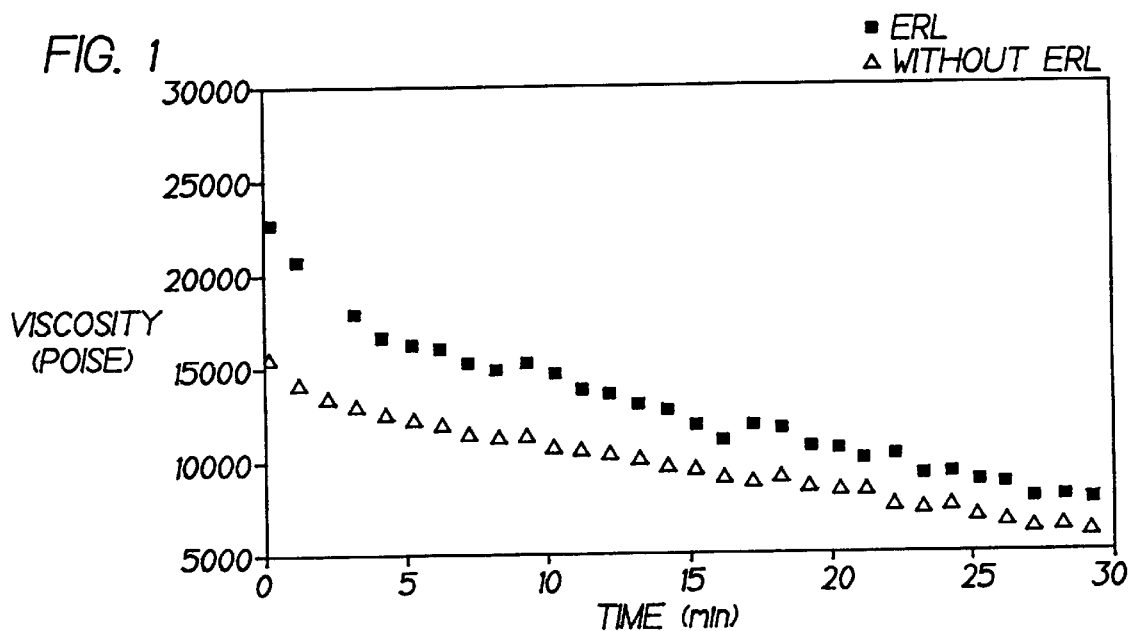
FIG. 1 is a graph of the melt thermal stability at 330° C. of one embodiment of the composition of the present invention.

In a preferred embodiment, the composition of the present invention comprises, from about 1 to about 99 pbw, more preferably from about 50 to about 95 pbw of the one or more polyetherimide resins; from about 1 to about 99 pbw, more preferably from about 2 to about 50 pbw of one or more polyester resins; and from about 0.01 to about 10 pbw, more preferably from about 0.05 to about 6 pbw of the epoxy compound. The compositions optionally contain at least one catalyst in an amount effective to improve at least one of impact resistance, hydrolytic resistance, and tab-bending performance of a molded specimen of the composition as compared to the same composition not containing the catalyst.

The one or more polyester resins each comprise recurring structural units, with each structural unit comprising a diol residue and a diacid residue. In a preferred embodiment, the thermoplastic resin composition comprises, as the polyester resin component of the composition:

(i) from about 1 to less than about 99 pbw of a first polyester resin, wherein from 50 to 100 mole percent of the structural units of the first polyester resin comprise a divalent alicyclic hydrocarbon radical as the diol residue of the structural unit; and (ii) up to about 98 pbw of a second polyester resin, wherein up to about 50 mole percent, of structural units of the second polyester resin comprise a divalent alicyclic hydrocarbon radical as the diol residue of the structural unit.

In a more highly preferred embodiment, the thermoplastic resin composition of the present invention comprises, based on 100 pbw of the thermoplastic resin composition, a mixture of: (a) from about 60 to about 90 pbw of the polyetherimide resin; (b) from about 5 to about 12 pbw of a first polyester resin; (c) from about 2 to about 35 pbw of a second polyester resin; and (d) about 0.1 to about 2.0 pbw epoxycyclohexylmethyl-3,4-epoxycyclohexanecarboxylate.

In a more highly preferred embodiment, the first and second polyester resins are present in a weight first polyester resin:weight second polyester resin ratio of from about 4:1 to about 1:4, more preferably from about 2:1 to about 1:3, and still more preferably from about 1:1 to about 1:2.

Polyetherimide Resins

The polyetherimide resins useful with the present invention are generically known compounds whose preparation and properties are described in U.S. Pat. Nos. 3,803,085 and 3,905,942, each of which is incorporated herein by reference.

Preferably, the polyetherimide used for preparing the blends of this invention comprises more than 1, typically from about 10 to 1000 or more, and more preferably from about 10 to about 500 structural units, of the formula (I):

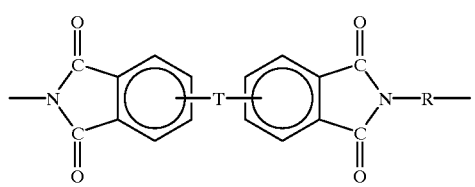
(I)

wherein T is —O— or a group of the formula —O—Z—O— wherein the divalent bonds of the —O— or the —O—Z—O— group are in the 3,3', 3,4', 4,3', or the 4,4' positions; Z includes, but is not limited to, a divalent radical of formulae (II).

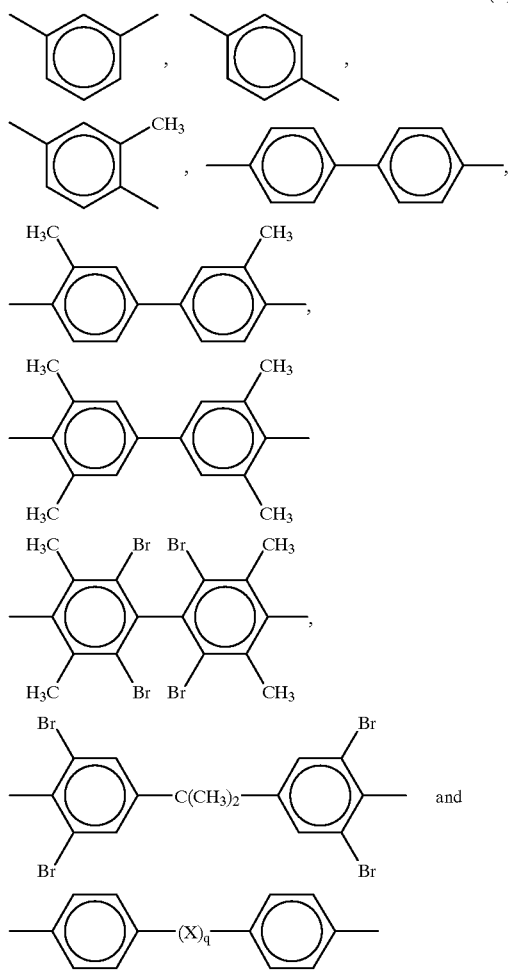
(II)

wherein X includes, but is not limited to, divalent radicals of the formulae (III):

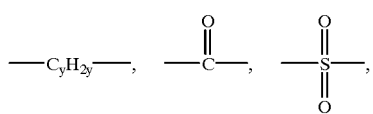
(III)

—O— and —S— wherein y is an integer from 1 to about 5, and q is 0 or 1; R includes, but is not limited to, a divalent organic radical: (a) aromatic hydrocarbon radicals having from 6 to about 20 carbon atoms and halogenated derivatives thereof, (b) alkylene radicals having from about 2 to about 20 carbon atoms, (c) cycloalkylene radicals having from about 3 to about 20 carbon atoms, and (d) divalent radicals of the general formula (IV):

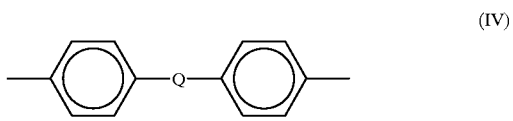
(IV)

where Q includes, but is not limited to, the formulae (V):

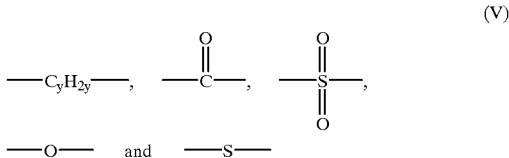
(V)

—O— and —S— where y is an integer from about 1 to about 5.

In one embodiment, the polyetherimide may be a copolymer which, in addition to the etherimide units described above, further contains polyimide structural units of the formula (VI):

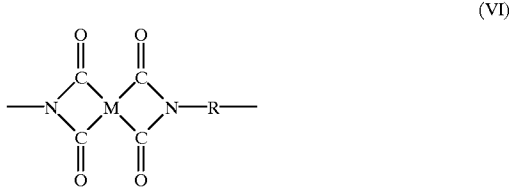
(VI)

wherein R is as previously defined for formula (I) and M includes, but is not limited to, formula (VII):

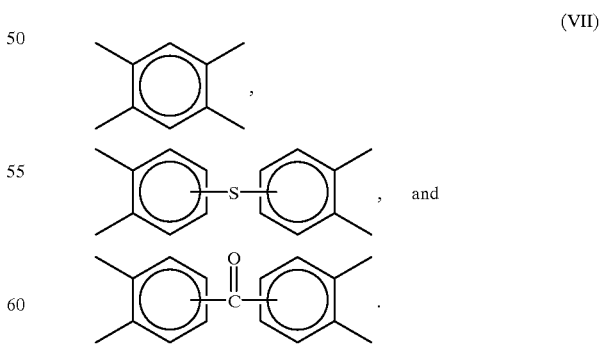
(VII)

The polyetherimide can be prepared by any of the methods well known to those skilled in the art, including the reaction of an aromatic bis(ether anhydride) of the formula (VIII):

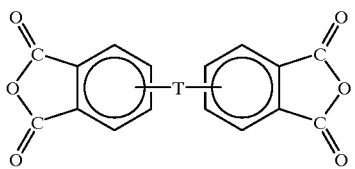

(VIII)

with an organic diamine of the formula (IX):

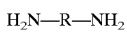

H₂N—R—NH₂ wherein T and R are defined as described above in formula (I). In general the reactions can be carried out employing well-known solvents, e.g., o-dichlorobenzene, m-cresol/toluene and the like to effect interaction between the anhydride of formula (VIII) and the diamine of formula (IX), at temperatures of about 100° C. to about 250° C. Alternatively, the polyetherimide can be prepared by melt polymerization of aromatic bis(ether anhydride)s and diamines accomplished by heating a mixture of the ingredients to elevated temperatures with concurrent stirring. Generally melt polymerizations employ temperatures of about 200° C. to about 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated herein by reference.

Illustrative examples of aromatic bis(ether anhydride)s of formula (VIII) include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,42-bis(3,4-dicarboxyphenoxy)diphenyl sulfone dianhydride; 2,2-bis[4-(2,3-dicarboxyphenoxy)phenyl] propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3 -dicarboxyphenoxy)-4'-3,4-dicarboxyphenoxy)diphenyl-2,2-propane dianhydride; 4-(2,3 -dicarboxyphenoxy)-4'-(3,4-dicarboxyphenoxy)diphenyl ether dianhydride; 4 -(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(ether anhydride)s included by formula (VIII) above includes, but is not limited to, compounds wherein T is of the formula (X):

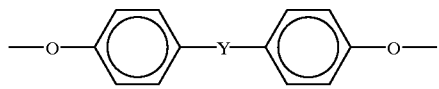

(X)

and the ether linkages, for example, are preferably in the 3,3', 3, 4', 4,3', or 4,4' positions, and mixtures thereof, and where Y includes, but is not limited to, the formulae (XI):

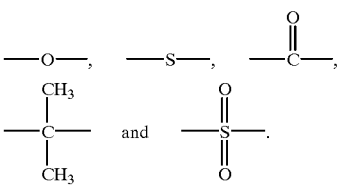

(XI)

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (IX) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy)ethane; benzidine; m-xylylenediamine; 2,4-diaminotoluene; 2,6-diaminotoluene; isomeric methyl-4,6-diethyl-1,3-phenylenediamines; bis(2-chloro-4-amino-3,5-diethylphenyl)methane; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Generally, useful polyetherimides have a melt index of between 0.1 and 10 grams per minute ("g/min"), as measured by American Society for Testing Materials ("ASTM") D1238 at 295° C., using a 6.6 kilogram ("kg") weight.

In a preferred embodiment, the polyetherimide resin of the present invention resin has a weight average molecular weight of from 10,000 to 150,000 grams per mole ("g/mole"), as measured by gel permeation chromatography, using a polystyrene standard. Such polyetherimide resins typically have an intrinsic viscosity [η] greater than about 0.2 deciliters per gram, preferably about 0.35 to about 0.7 deciliters per gram measured in m-cresol at 25° C.

Included among the many methods of making the polyetherimide are those disclosed in U.S. Pat. Nos. 3,847,867, 3,814,869, 3,850,885, 3,852,242, 3,855,178, and 3,983,093. These patents are incorporated herein by reference for the purpose of teaching, by way of illustration, general and specific methods for preparing polyetherimide for use in the blends of this invention.

In a preferred embodiment, the polyetherimide resin comprises structural units according to formula (I) wherein each R is independently paraenylene or meta-phenylene and T is a divalent radical of the formula (XII):

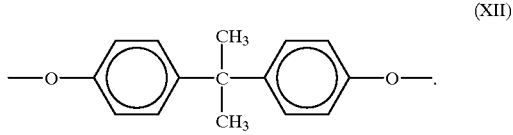

Polyester Resins

The one or more polyester resins of the composition of the present invention are each typically obtained through the condensation or ester interchange polymerization of a diol or diol equivalent with a diacid or diacid equivalent, and each comprise recurring structural units according to formula (XIII):

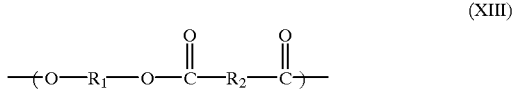

wherein $R_1$ represents the residue of the diol or diol equivalent ("diol residue"), $R_2$ represents the residue of the diacid or diacid equivalent ("diacid residue"), and each $R_1$ and $R_2$ is independently a divalent acyclic hydrocarbon radical, a divalent alicyclic hydrocarbon radical, or a divalent aromatic hydrocarbon radical.

As used herein, the terminology "acyclic hydrocarbon radical" means a straight chain or branched saturated hydrocarbon radical, preferably containing about 2 to about 12 carbon atoms per radical, such as, for example, dimethylene, trimethylene, tetramethylene, hexamethylene and octamethylene, among others.

As used herein, the terminology "alicyclic hydrocarbon radical" means a hydrocarbon radical containing one or more saturated hydrocarbon rings, preferably containing about 4 to about 10 carbon atoms per ring, per radical which may optionally be substituted on one or more of the rings with one or more alkyl or alkylene groups, each preferably containing about 2 to about 6 carbon atoms per group and which, in the case of two or more rings, may be fused rings, such as, for example, 2,2,4,4-tetramethyl-1,3-cyclobutylene, 1,4-cyclohexylene, cyclohexylene-1,4-dimethylene, and 1,4-cyclooctylene, among others.

As used herein, the term "aromatic hydrocarbon radical" means a hydrocarbon radical containing one or more aromatic rings per radical, which may optionally be substituted on the one or more aromatic rings with one or more alkyl or alkylene groups, each preferably containing about 2 to about 6 carbon atoms per group and which, in the case of two or more rings, may be fused rings, such as, for example, 1,2-phenylene, 1,3-phenylene, 1,4-phenylene, 2,6-naphthalene, and 2,7-phenanthrylene, among others.

Suitable diols include acyclic diols such as, for example, ethylene glycol, 1,3-propylene glycol, 1,4-butane glycol, 1,5-pentane diol, 1,6-hexane diol, 1,7-heptane diol, 1,8-octane diol, 1,9-nonane diol, 1,10-decane diol, 1,12-dodecane diol; alicyclic diols such as, for example, 2,2,4,4-tetramethyl-1,3-cyclobutane diol, 1,2-cyclopentanediol, 1,4-cyclohexanedimethanol, including cis-1,4-cyclohexanedimethanol and trans-1,4-cyclohexanedimethanol; and aromatic diols such as, for example, bisphenol A and hydroquinone, among others. Suitable diol equivalents include corresponding esters, such as for example, dialkyl esters and diaryl esters, among others.

Suitable diacids include, for example, dicarboxylic acids, such as, for example, phthalic acid, isophthalic acid, terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid, cis-1,4-cyclohexane dicarboxylic acid, trans-1,4-cyclohexane dicarboxylic acid, 4,4'-bisbenzoic acid, and naphthalene-2,6-dicarboxylic acid, among others. Suitable diacid equivalents include, for example, corresponding anhydride, ester or halide derivatives, such as, for example, phthalic anhydride, dimethyl terephthalate, and succinyl chloride, among others.

In a preferred embodiment, the polyester resins have a number average molecular weight of about 10,000 to about 100,000 g/mole, more preferably about 15,000 to about 50,000 g/mole, as measured by gel permeation chromatography using a polystyrene standard.

Methods for making polyester resins are well know in the art, see for example, Kirk-Othmer Encyclopedia of Chemical Technology, Fourth Edition, Vol. 19 at pp. 609–653, John Wiley & Sons (1996).

First Polyester Resin

In a preferred embodiment, from 50–100 mol %, more preferably about 90–100 mol %, and most preferably 100 mol %, of the structural units of the first polyester resin comprise a divalent alicyclic hydrocarbon radical, most preferably a cyclohexane-1,4-dimethylene radical, as the diol residue of the structural unit and any remaining structural units of the first polyester resin preferably comprise a divalent acyclic hydrocarbon radical, most preferably a dimethylene radical, as the diol residue of the structural unit.

In an alternative preferred embodiment, from 50 to less than 90 mol %, more preferably from 60 to 85 mol % of the structural units of the first polyester resin comprise a divalent alicyclic hydrocarbon radical, most preferably a cyclohexane-1,4-dimethylene radical, as the diol residue of the structural unit, and the remaining structural units of the first polyester resin preferably comprise a divalent acyclic hydrocarbon radical, most preferably a dimethylene radical, as the diol residue of the structural unit.

In a preferred embodiment, the first polyester resin comprises structural units wherein a divalent aromatic hydrocarbon radical, preferably a 1,4-phenylene radical or 1,3-phenylene radical is the diacid residue of the structural unit. In highly preferred embodiments, each of the diacid residue structural units of the first polyester resin comprise at least 50 mol % 1,4-phenylene radicals, preferably at least 75 mol % 1,4-phenylene radicals, and most preferably at least about 95 mol % 1,4-phenylene radicals, as the diacid residue of the structural unit.

In a highly preferred embodiment, the first polyester resin is a poly(cyclohexanedimethanol terephthalate) resin. Suitable polyester resins are made, for example, by the polymerization of 1,4-cyclohexanedimethanol with terephthalic acid.

Other examples of possible first polyester resins include, but are not limited to, poly(ethylene terephthalate), poly(ethylene naphthalate), poly(butylene naphthalate), copolymers of terephthalic acid with ethylene glycol and cyclohexanedimethanol, and copolymers of 2,6-naphthalene dicarboxylic acid with ethylene glycol and cyclohexanedimethanol, among others.

Second Polyester Resin

In a first preferred embodiment, 0 to less than about 50 mol %, still more preferably about 20 to about 40 mol %, of structural units of the second polyester resin comprise a divalent alicyclic hydrocarbon radical, most preferably a cyclohexane-1,4-dimethylene radical, as the diol residue of the structural unit and about 50 to about 90 mol %, more preferably about 60 to about 80 mol %, of the structural units of the second polyester resin comprise a divalent acyclic hydrocarbon radical, most preferably a dimethylene radical, as the diol residue of the structural unit.

In a second preferred embodiment, 100 mol % the structural units of the second polyester resin comprise a divalent acyclic hydrocarbon radical, most preferably a dimethylene radical, as the diol residue of the structural unit.

In a preferred embodiment, the second polyester resin is a copolyester resin comprising recurring structural units wherein each structural unit comprises a divalent aromatic hydrocarbon radical, preferably a 1,4-phenylene radical or 1,3-phenylene radical, as the diacid residue of the structural unit. In highly preferred embodiments, each of the diacid residue structural units of the second polyester resin comprise at least 50 mol % 1,4-phenylene radicals, preferably at least 75 mol % 1,4-phenylene radicals, and most preferably at least about 95 mol % 1,4-phenylene radicals, as the diacid residue of the structural unit.

In a first highly preferred embodiment, the second polyester resin is a poly(ethylene-co-cyclohexane-1,4-dimethylene terephthalate) resin. Suitable polyester resins are made, for example, by the polymerization of ethylene glycol and 1,4-cyclohexanedimethanol with terephthalic acid.

In a second highly preferred embodiment, the second polyester resin is a poly(ethylene terephthalate) resin. Suitable polyester resins are made, for example, by the polymerization of ethylene glycol with terephthalic acid.

Other possible second polyester resins include, but are not limited to: poly(ethylene naphthalate), poly(butylene naphthalate), or copolymers of 2,6-naphthalene dicarboxylic acid with ethylene glycol and cyclohexanedimethanol, among others, wherein the second polyester resin is different from the first polyester resin.

Epoxy Compound

The epoxy compounds suitable for use as the epoxy compound component of the present invention are liquid or solid compounds containing at least one epoxy group per molecule. Suitable epoxy compounds include but are not limited to, for example, the following groups:

i. aliphatic epoxies such as dodecatriene dioxide, dipentene dioxide, and 1, 2, 7, 8-diepoxyoctane;

ii. alicyclic epoxies and bridged alicyclic epoxies such as vinyl cyclohexane dioxide, 3,4-epoxycyclohexylmethyl-3,4-epoxycyclohexanecarboxylate, dicyclopentadiene dioxide, butenylcyclopentene dioxide, and bis(3,4-epoxycyclohexylmethyl)adipate;

iii. glycidyl esters of carboxylic acids such as diglycidyl phthalate and diglycidyl adipate;

iv. glycidyl ethers, such as diglycidyl ether of butanediol, glycidyl ethers of bisphenols including but not limited to bisphenol A, resorcinol, hydroquinone, pyrocatechol, and bisphenol F, glycidyl ethers of halogenated bisphenols, phenyl monoglycidyl ether, and triglycidyl cyanurate;

v. glycidyl adducts of amines and amides, such as N,N-diglycidylaniline, and triglycidyl isocyanurate;

vi. epoxy novolak resins;

vii. linear non-glycidyl epoxy resins such as epoxidized soybean oil; and viii. epoxy-functional polysiloxanes, such as the diglycidyl ether of 1,3-bis(3-hydroxypropyl) tetramethyldisiloxane.

In an especially preferred embodiment, the epoxy compound is 3,4-epoxycyclohexylmethyl-3,4-epoxycyclohexanecarboxylate. The epoxy compound is preferably used in an amount effective to improve at least one of impact resistance, hydrolytic resistance, and tab-bending performance of a molded specimen of the composition. An effective amount of the epoxy compound is preferably up to about 10 pbw, more preferably up to about 5 pbw, based on the weight of the entire composition.

In another preferred embodiment, a catalyst may be employed to improve at least one of impact resistance, hydrolytic resistance, and tab-bending performance of a molded specimen of the composition as compared to the same composition not containing the catalyst. Suitable catalysts include metal salts of a carboxylic acid or phosphorus compound, such as, for example, sodium stearate, sodium benzoate, and sodium benzene phosphinate. When a catalyst is used, it is preferably used in an effective amount to improve at least one of impact resistance, hydrolytic resistance, and tab-bending performance of a molded specimen of the composition as compared to the same composition not containing the catalyst. An effective amount of the catalyst is preferably up to about 5 pbw, more preferably up to about 1 pbw, based on the weight of the entire composition.

The epoxy compound and catalyst may be added to the blend either directly or can be precompounded with the polyester resin, preferably the first polyester resin. If added directly into the blend, up to about 5.0 pbw of the epoxy compound and, optionally, up to about 1.0 pbw catalyst can be utilized, with about 0.1 to about 2.0 pbw epoxy compound and from 0.001 to about 1.0 pbw catalyst being preferred, wherein all weights are based upon the weight of the entire composition. Sodium stearate is a preferred catalyst.

Alternatively, if the epoxy compound and optional catalyst are pre-compounded into the polyester resin, preferably the first polyester resin, up to about 25.0 pbw epoxy compound and catalyst, and the balance polyester resin can be used, with about 0.5 to about 5.0 pbw epoxy compound, about 0.001 to about 1.0 pbw catalyst, with the balance polyester resin preferred, wherein the pbw is based on 100 pbw polyester resin, epoxy compound, and catalyst.

Other Additives

The thermoplastic resin composition of the present invention may optionally also contain various conventional additives, such as antioxidants, such as, for example, organophosphites, for example, tris(nonyl-phenyl) phosphite, tris(2,4-di-t-butylphenyl)phosphite, bis(2,4-di-t-butylphenyl)pentaerythritol diphosphite or distearyl pentaerythritol diphosphite, alkylated monophenols, polyphenols and alkylated reaction products of polyphenols with dienes, such as, for example, tetrakis(methylene)-3,5-di-t-butyl-4-hydroxycinnamate, butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with monohydric or polyhydric alcohols, esters of thioalkyl or thioaryl compounds, such as, for example, distearylthiopropionate, dilaurylthiopropionate, ditridecylthiodipropionate, amides of beta-(3,5-di-tert-butyl-4-hydroxyphenol)-propionic acid; fillers and reinforcing agents, such as, for example, silicates, TiO$_2$, glass fibers, carbon black, graphite, calcium carbonate, talc, mica and other additives such as, for example, UV absorbers, light stabilizers, lubricants, plasticizers, carbon fibrils, pigments, dyes, colorants, antistatic agents and blowing agents.

The preparation of the compositions of the present invention is normally achieved by merely blending the ingredients under conditions for the formation of an intimate blend. Such conditions often include solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the blend through at least one vent port in the extruder to remove volatile impurities in the composition.

The composition of the present invention can be molded into useful articles, such as, for example, heat resistant containers, by a variety of means such as, for example, injection molding and extrusion, among others conventionally known in the art.

Examples

The thermoplastic resin compositions of Samples 1–6 were made by combining the components described below in the relative amounts (each expressed in percent by weight, based on the total weight of the respective thermoplastic resin composition) set forth in Table I. The components used in the thermoplastic resin compositions were as follows:

| | |
|---|---|
| PEI | Polyetherimide resin made by condensation of 2,2-bis[4-(3,4-dicarboxyphenoxy)phenyl] propane dianhydride with meta-phenylene diamine and having a melt index of 0.9 g/min at 337° C. (Ultem ® 1000, General Electric Company, Pittsfield, MA); |
| PET | Poly(ethylene terephthalate) resin having an intrinsic viscosity of 0.57 (Merge 3903, E.I. duPont de Nemours and Company, Wilmington, DE); |
| PCT | Poly(cyclohexanedimethanol terephthalate) resin having a nominal inherent viscosity of 0.77, (Ektar ™ PCT 13787 resin, Eastman Chemical Company, Kingsport, TN); |
| PETG | Poly(ethylene-co-cyclohexane-1,4-dimethylene terephthalate) resin having a nominal inherent viscosity of 0.75, (Eastar ™ PETG Copolyester 6763 resin, Eastman Chemical Company); |
| ERL4221 | 3,4-epoxy cyclohexylmethyl-3,4-epoxy cyclohexanecarboxylate (ERL 4221, Union Carbide, Danbury, CT); |
| Irganox ™ 1010 | Tetrakis(methylene(3,5-di-t-butyl-4-hydroxyhydrocinnamate)) (Ciba Specialty Chemicals Corporation, Tarrytown, NY); |
| Irgafos ™ 168 | 2,4-di-tert-butylphenyl phosphite (Ciba Specialty Chemicals Corporation); and |
| Na-Stearate | Sodium stearate (Witco Chemical Co., Edicott, NY). |

Test specimens of the compositions of Samples 1–6 as set forth in Table I were made by combining the components using vacuum venting on a 2.5 inch Egan single screw extruder at 100 rpm using barrel set temperatures of 540–600° F. All extrudates were quenched in water, pelletized, and dried in a circulating air oven at 300° F for 4 hours before testing and molding. Molding was performed at 600° F. in an 85 ton Newbury molding machine. The samples were then subjected to the measurements set forth below.

TABLE I

| Components | Sample Nos. | | | | | |
|---|---|---|---|---|---|---|
|  | 1 | 2 | 3 | 4 | 5 | 6 |
| PEI | 80 | 80 | 80 | 79.8 | 79.9 | 79.8 |
| PCT | 8 |  |  |  |  |  |
| PETG | 12 | 12 | 12 | 12 | 12 | 12 |
| PCT* |  | 8 |  | 8 | 8 |  |
| PCT** |  |  | 8 |  |  | 8 |
| Irganox ™ 1010 |  |  |  | 0.1 | 0.1 | 0.1 |
| Irgafos ™ 168 |  |  |  | 0.1 |  | 0.1 |

*comprises 99.00 wt % PCT, 1.00 wt % ERL 4221.
**comprises 98.98 wt % PCT, 1.00 wt % ERL 4221, and 0.02 wt % sodium stearate.

The test specimens were visually examined and qualitatively rated with respect to visual clarity. Heat distortion temperature was measured at 264 pounds per square inch ("psi") on unannealed 0.25 inch thick test specimens according to ASTM D648. Yellowness Index was measured according to ASTM D1925 on 0.125 thick test specimens. Tensile strength at yield, tensile strength at break, tensile elongation and tensile modulus were measured according to ASTM 638 using 0.125 inch thick test specimens. Flexural modulus and flexural strength were measured according to ASTM D790 using a 6 inch×0.5 inch×0.25 inch test specimen. Reverse notched Izod impact strength was measured according to ASTM D256 using 2.5 inch×0.5 inch×0.125 inch test specimens. Dart impact strength was determined according to ASTM D3763 at 73° F. using 4 inch diameter× 0.125 inch thick test specimens. The melt index ("MI") of each of the sample compositions was measured according to ASTM D1238 at 295° C., using a 6.6 kilogram ("kg") weight.

Results of the testing are set forth below in Tables II and III as follows: heat distortion temperature ("HDT"), expressed in degrees centigrade ("° C."); yellowness index ("YI"); tensile strength at yield, tensile strength at break and tensile modulus, each expressed in kilo-pounds per square inch ("kpsi"); tensile elongation expressed as a percentage ("%") of original specimen length; flexural strength and flexural modulus, each expressed in kpsi; notched Izod impact and reverse notched Izod impact, each expressed in foot-pounds per inch ("ft-lb/in"); specific gravity; dart impact, expressed in foot-pounds ("ft-lb"); and melt index at 295° C., expressed in grams per minute ("g/min"). Table II sets forth the reverse notched Izod evaluation for samples which were autoclaved in conditions of 120° C. for 1, 3, 5, and 7 days.

TABLE II

| Reverse Notched Izod | Sample Nos. | | | | | |
|---|---|---|---|---|---|---|
| (ft-lb/in) | 1 | 2 | 3 | 4 | 5 | 6 |
| Initial | 17.1 | 27.8 | 31.0 | 22.4 | 25.7 | 21.4 |
| 1 Day | 12.7 | 16.0 | 16.5 | 15.0 | 14.9 | 14.9 |
| 3 Days | 9.4 | 13.7 | 13.3 | 11.6 | 9.8 | 12.2 |
| 5 Days | 7.4 | 12.5 | 13.5 | 10.4 | 10.0 | 11.8 |
| 7 Days | 6.3 | 9.9 | 11.4 | 8.7 | 8.6 | 10.5 |

TABLE III

| Properties | Sample Nos. | | | | | |
|---|---|---|---|---|---|---|
| | 1 | 2 | 3 | 4 | 5 | 6 |
| MI (g/min) | 0.52 | 0.52 | 0.6 | 0.63 | 0.57 | 0.56 |
| HDT(° C.) | 164 | 163 | 163 | 163 | 164 | 163 |
| Tensile Strength at yield (kpsi) | 15.1 | 15.2 | 15.6 | 14.9 | 15.0 | 15.1 |
| Tensile strength at break (kpsi) | 10.7 | 11.8 | 10.9 | 10.9 | 11.2 | 10.7 |
| Tensile Elongation (%) | 16 | 12 | 60 | 39 | 40 | 35 |
| Tensile Modulus (kpsi) | 514 | 464 | 488 | 564 | 532 | 522 |
| Flexural Strength at break (kpsi) | 21.8 | 21.6 | 21.2 | 21.1 | 21.2 | 21.3 |
| Flexural Modulus (kpsi) | 474 | 470 | 460 | 458 | 457 | 464 |
| Notched Izod (ft-lb/in) | 0.6 | 0.5 | 0.53 | 0.88 | 0.56 | 0.55 |
| Dynatup, max-load (ft-lb) | 5.8 | 20.1 | 11.4 | 14.4 | 14.2 | 16.5 |

The compositions of Samples 2–6 of the present invention exhibit higher impact resistance measured by reverse notched Izod, before and after autoclaving, than the control Sample 1.

Tab-bending performance was then determined by testing on 0.031 inch double-gated and fan-gated flame bars, Samples 7–12, of the composition set forth in Table IV. Note, on double-gated flame bars ("DGFB"), parts can be selectively bent between the knit-line and the gate, giving the tab-bending performance evaluation for when the melt flow direction is perpendicular to the bending axis. Likewise, for the fan-gated flame bars ("FGFB"), the melt flow direction is almost parallel to the bending axis and affords a tab-bending performance evaluation parallel to the bending axis. The test results are set forth in Table V.

TABLE IV

| Components | Sample Nos. | | | | | |
|---|---|---|---|---|---|---|
| | 7 | 8 | 9 | 10 | 11 | 12 |
| PEI | 100 | 85 | 84.35 | 84.05 | 83.55 | 82.55 |
| PET | — | 15 | 15 | 15 | 15 | 15 |
| ERL 4221 | — | — | 0.2 | 0.5 | 1 | 2 |
| Na-Stearate | — | — | 0.05 | 0.05 | 0.05 | 0.05 |

TABLE V

| Properties | Sample Nos. | | | | | |
|---|---|---|---|---|---|---|
| | 7 | 8 | 9 | 10 | 11 | 12 |
| Tab-bending (DGFB) | | | | | | |
| Break at 1st bending? | No | No | No | No | No | No |
| Tab-bending (FGFB) | | | | | | |
| Break at 1st bending? | Yes | Yes | | | No | |
| MI (g/min) | — | 0.42 | — | — | 0.41 | — |
| HDT (° C.) | 202 | 169 | — | — | 169 | — |
| Yellowness Index | 92 | 74 | — | — | 82 | — |

TABLE V-continued

| Properties | Sample Nos. | | | | | |
|---|---|---|---|---|---|---|
| | 7 | 8 | 9 | 10 | 11 | 12 |
| Tensile Strength at yield (kpsi) | 16.1 | 16.7 | — | — | 16.9 | — |
| Tensile Strength at break (kpsi) | 14.1 | 11.5 | — | — | 11.4 | — |
| Tensile Elongation at break (%) | 78 | 9 | — | — | 9 | — |
| Tensile Modulus (kpsi) | 514 | 496 | — | — | 576 | — |
| Flexure Strength at break (kpsi) | 236 | 240 | — | — | 240 | — |
| Flexure Modulus (kpsi) | 532 | 512 | — | — | 522 | — |
| Notch Izod (ft-lb/in) | 1.0 | 0.5 | — | — | 0.5 | — |
| Reverse Notch Izod (ft-lb/in) | 18.4 | 17.3 | — | — | 16.6 | — |
| Specific Gravity (g/cm$^3$) | 1.28 | 1.29 | — | — | 1.29 | — |

Figure 2:
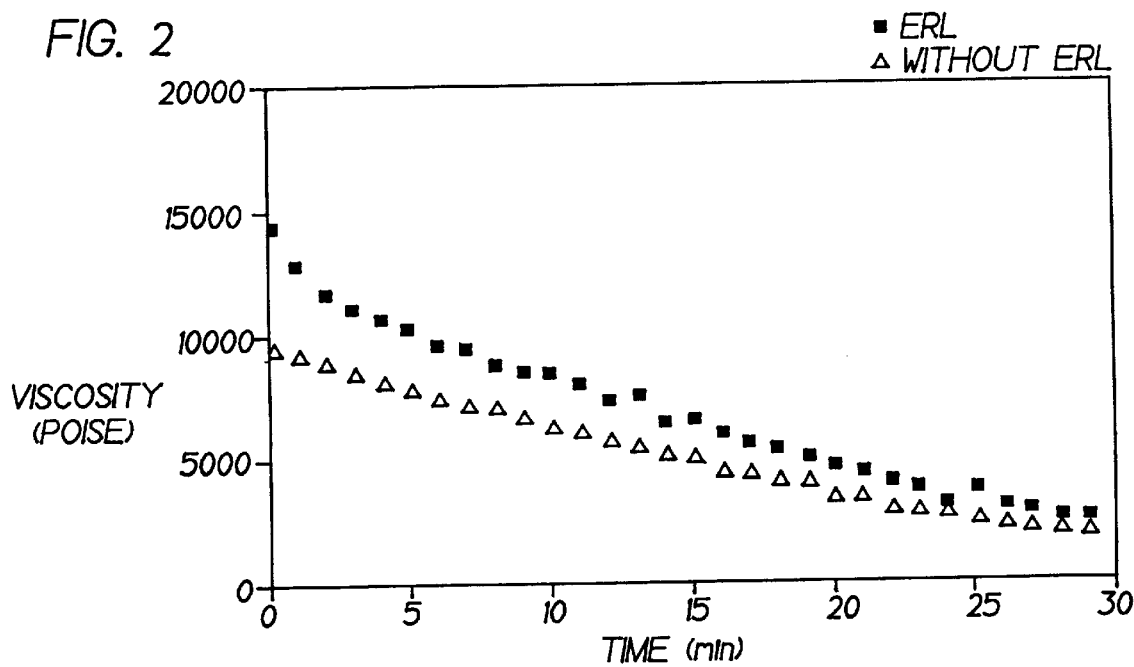
FIG. 2 is a graph of the melt thermal stability at 340° C. of one embodiment of the composition of the present invention.
Figure 3:
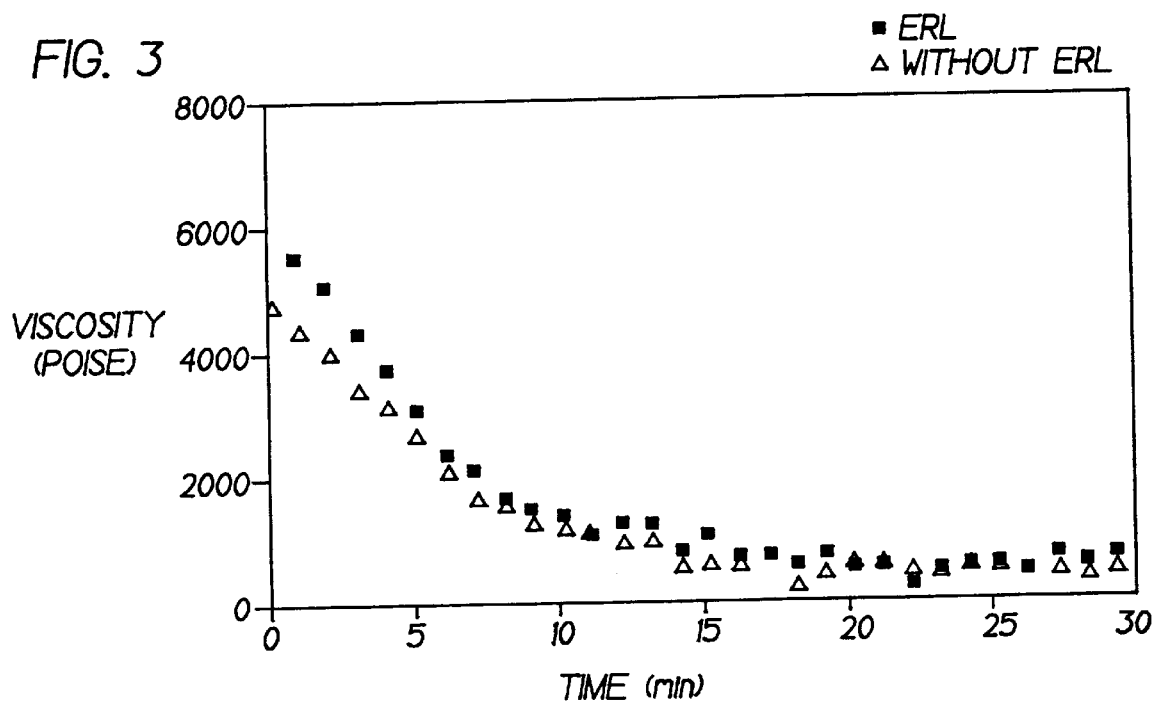
FIG. 3 is a graph of the melt thermal stability at 350° C. of one embodiment of the composition of the present invention.

Compared to the blends without ERL 4221 and sodium stearate, the blends have improved tab-bending performance tested on 0.031 inch double-gated and fan-gated flame bars. The melt thermal stability of each of the sample compositions was obtained by determining melt viscosities of ternary blends (80 pbw PEI, 8 pbw PCT, 12 pbw PETG); with the PCT comprising: (a) 0.08 wt% ERL 4221 (Sample 13); or (b) no ERL 4221 (Sample 14)) as a function of time, at 0.25 radians per second (rad/s using parallel plate rheometry on the Rheometrics Dynamic Spectrometer testing machine at temperatures of 330° C., 340° C. and 360° C. Sample 13 was prepared using PCT pellets which had been preextruded with 1 wt % ERL 4221 to form a pelletized concentrate which was mixed with polyetherimide resin pellets and PETG pellets. As is shown in FIGS. 1–3, Sample 13 showed higher initial melt viscosity and higher melt viscosity after 30 minutes of testing compared to the control, Sample 14, at all temperatures used.

The polyetherimide-polyester blends of the present invention exhibit improved tab-bending properties, thermal stability, impact resistance, and/or similar or improved mechanical properties, thereby rendering this composition useful for numerous applications including microwave containers, animal enclosures, and other molded parts.

What is claimed:

1. A thermoplastic resin composition comprising:
   (a) from about 1 to less than about 99 pbw of one or more polyetherimide resins;
   (b) from about 1 to less than about 99 pbw of one or more polyester resins;
   (c) at least one epoxy compound having one or more epoxy functional groups per molecule in an amount effective to improve at least one of impact resistance, hydrolytic resistance, and tab-bending performance of a molded specimen of the composition; and
   (d) from 0.001 to about 5 pbw of at least one catalyst in an amount effective to improve at least one of impact resistance, hydrolytic resistance, and tab-bending performance of a molded specimen of the composition as compared to the same composition not containing the catalyst;
wherein all weights are based upon 100 parts by weight of the thermoplastic composition.

2. The thermoplastic resin composition of claim 1, wherein the composition comprises from about 50 parts by weight to about 95 parts by weight of the one or more polyetherimide resins; from about 2 parts by weight to about 50 parts by weight of the one or more polyester resins; and from 0.01 parts by weight to about 10 parts by weight epoxy compound.

3. The composition of claim 1, wherein the polyetherimide resin comprises structural units of the formula:

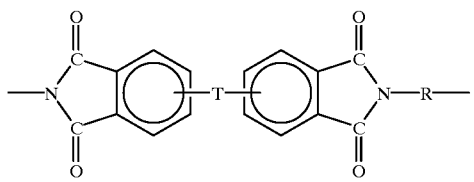

wherein T is —O— or a group of the formula —O—Z—O— wherein the divalent bonds of the —O— or the —O—Z—O— group are in the 3,3', 3, 4', 4,3', or the 4,4' positions; Z is a divalent radical selected from the group consisting of formulae:

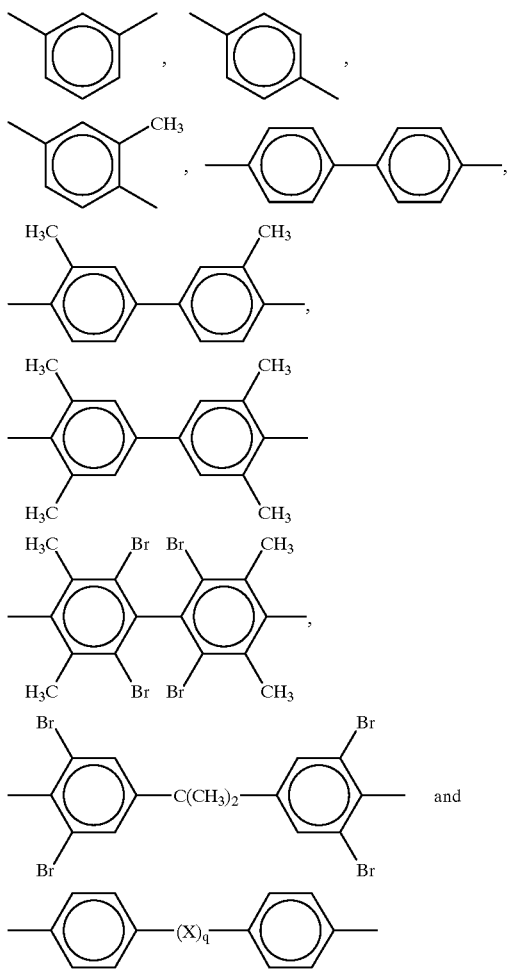

wherein X is a member selected from the group consisting of divalent radicals of the formulae:

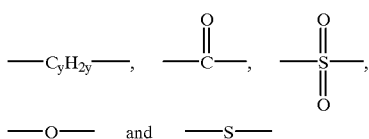

wherein y is an integer from 1 to about 5, and q is 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the formula:

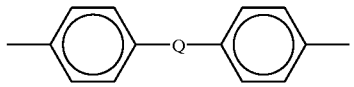

where Q is a member selected from the group consisting of formulae:

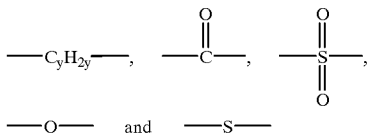

where y is an integer from about 1 to about 5.

4. The composition of claim 1, wherein the polyetherimide resin is the reaction product formed by polymerization of 2,2-bis propane dianhydride with meta-phenylene diamine.

5. The composition of claim 1, wherein the one or more polyester resins are selected from the group consisting of poly(ethylene terephthalate), poly(butylene terephthalate) poly(ethylene naphthalate), poly(butylene naphthalate), poly(cyclohexanedimethanol terephthalate), copolymers of terephthalic acid with ethylene glycol and cyclohexanedimethanol, and copolymers of 2,6-naphthalene dicarboxylic acid with ethylene glycol and cyclohexanedimethanol.

6. The composition of claim 1, wherein the one or more polyester resins each comprise recurring structural units, each comprising a diol residue and a diacid residue, and wherein the thermoplastic resin composition comprises, as the polyester resin component of the composition:

a) from about 1 to less than about 99 pbw of a first polyester resin, wherein from 50 to 100 mole percent of the structural units of the first polyester resin comprise a divalent alicyclic hydrocarbon radical as the diol residue of the structural unit; and b) from 2 to less than about 98 pbw of a second polyester resin, wherein from 0 to less than about 50 mole percent, of structural units of the second polyester resin comprise a divalent alicyclic hydrocarbon radical as the diol residue of the structural unit.

7. The composition of claim 6, wherein the first polyester resin comprises a polyester resin selected from the group consisting of poly(cyclohexanedimethanol terephthalate) and copolymers of terephthalic acid with ethylene glycol and cyclohexanedimethanol, and the second polyester resin comprises a polyester resin selected from the group consisting of poly(ethylene terephthalate), and copolymers of terephthalic acid with ethylene glycol and cyclohexanedimethanol.

8. The composition of claim 1, wherein the epoxy compound is 3,4-epoxycyclohexylmethyl-3,4-epoxycyclohexanecarboxylate.

9. The composition of claim 1, wherein the catalyst is selected from the group consisting of sodium stearate, sodium benzoate, and sodium benzene phosphinate.

10. The composition of claim 1, wherein the catalyst is present in an amount up to about 1 pbw based on the weight of the entire composition.

11. The composition of claim 1, wherein the epoxy is combined with at least one of the one or more polyester resins prior to adding the epoxy compound to the thermoplastic resin composition.

12. The composition of claim 1, wherein the composition is in particulate form.

13. An article molded from the composition of claim 1.

14. A method to improve at least one of impact resistance, hydrolytic resistance, and tab-bending performance of a molded specimen, wherein the method comprises:

blending under conditions for the formation of an intimate blend: (a) from about 1 to less than about 99 pbw of one or more polyetherimide resins; (b) from about 1 to less than about 99 pbw of one or more polyester resins; (c) at least one epoxy compound having one or more epoxy functional groups per molecule in an amount effective to improve at least one of impact resistance, hydrolytic resistance, and tab-bending performance of a molded specimen of the composition; and (d) from 0.001 to about 5 pbw of at least one catalyst in an amount effective to improve at least one of impact resistance, hydrolytic resistance, and tab-bending performance of a molded specimen of the composition as compared to the same composition not containing the catalyst;

wherein all weights are based on 100 parts by weight of the thermoplastic composition.

15. A thermoplastic resin composition consisting essentially of:

(a) from about 1 to less than about 99 pbw of one or more polyetherimide resins;

(b) from about 1 to less than about 99 pbw of one or more polyester resins;

(c) at least one epoxy compound having one or more epoxy functional groups per molecule in an amount effective to improve at least one of impact resistance, hydrolytic resistance, and tab-bending performance of a molded specimen of the composition; and (d) from 0.001 to about 5 pbw of at least one catalyst in an amount effective to improve at least one of impact resistance, hydrolytic resistance, and tab-bending performance of a molded specimen of the composition as compared to the same composition not containing the catalyst;

wherein all weights are based upon 100 parts by weight of the thermoplastic composition.

* * * * *